United States Patent
Sawada et al.

(10) Patent No.: US 10,351,064 B2
(45) Date of Patent: Jul. 16, 2019

(54) VEHICLE VISUAL RECOGNITION DEVICE HAVING PROJECTION UNIT

(71) Applicant: KABUSHIKI KAISHA TOKAI-RIKA-DENKI-SEISAKUSHO, Aichi (JP)

(72) Inventors: Kazuhiro Sawada, Aichi (JP); Hiroyuki Muto, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/257,337

(22) Filed: Sep. 6, 2016

(65) Prior Publication Data

US 2017/0066386 A1 Mar. 9, 2017

(30) Foreign Application Priority Data

Sep. 8, 2015 (JP) .................................. 2015-176925

(51) Int. Cl.
*B60R 1/074* (2006.01)
*B60R 11/02* (2006.01)
(Continued)

(52) U.S. Cl.
CPC .............. *B60R 1/074* (2013.01); *B60K 35/00* (2013.01); *B60Q 1/2665* (2013.01); *B60Q 1/323* (2013.01);
(Continued)

(58) Field of Classification Search
CPC ............ B60Q 2400/50; B60Q 2400/40; B60Q 1/2665; B60Q 1/323; F21S 10/007;
(Continued)

(56) References Cited

U.S. PATENT DOCUMENTS 4,809,137 A * 2/1989 Yamada ................. B60Q 1/245
362/144
7,731,403 B2 * 6/2010 Lynam ................... B60K 35/00
257/79
(Continued)

FOREIGN PATENT DOCUMENTS

CN 202382141 U 8/2012
JP WO 2005108165 A1 * 11/2005 ........... B60Q 1/2665
(Continued)

OTHER PUBLICATIONS

Japanese Office Action for corresponding Japanese Patent Application No. 2015-176925 dated Nov. 8, 2016 and English translation thereof.
(Continued)

*Primary Examiner* — Bao-Luan Q Le
(74) *Attorney, Agent, or Firm* — Roberts Mlotkowski Safran Cole & Calderon P.C.

(57) ABSTRACT

A vehicle visual recognition device comprises: a rotating body disposed at a vehicle exterior and supported by a vehicle body so as to be rotatable, and including a visual recognition unit that assists visual recognition of an occupant of a vehicle; an attachment member attached to the rotating body; and a projection unit including an optical member housed in a housing body, the housing body being retained by the attachment member, and the projection unit projecting an image outside the rotating body through the optical member.

13 Claims, 7 Drawing Sheets

(51) Int. Cl.
*B60K 35/00* (2006.01)
*B60Q 1/26* (2006.01)
*B60Q 1/32* (2006.01)
*B60R 1/06* (2006.01)
*B60R 1/12* (2006.01)
*B60R 11/00* (2006.01)

(52) U.S. Cl.
CPC ............... *B60R 1/06* (2013.01); *B60R 1/12* (2013.01); *B60R 1/1207* (2013.01); *B60R 11/0229* (2013.01); *B60K 2370/334* (2019.05); *B60K 2370/797* (2019.05); *B60R 2001/1253* (2013.01); *B60R 2011/004* (2013.01); *B60R 2011/0085* (2013.01)

(58) Field of Classification Search
CPC ....... B60R 11/0229; B60R 1/06; B60R 1/074; B60R 1/12; B60R 1/1207; B60R 2001/1215; B60R 2001/1253; B60R 2011/004; B60R 2011/0085
See application file for complete search history.

(56) References Cited

U.S. PATENT DOCUMENTS

| | | | | |
|---|---|---|---|---|
| 7,878,693 | B2* | 2/2011 | Liesener | B60R 1/1207 |
| | | | | 362/293 |
| 8,568,006 | B2* | 10/2013 | Asai | B60Q 1/2665 |
| | | | | 362/494 |
| 8,922,388 | B2* | 12/2014 | Nykerk | B60Q 1/0023 |
| | | | | 340/468 |
| 9,178,371 | B2* | 11/2015 | Koelsch | H02J 7/0047 |
| 9,321,395 | B2* | 4/2016 | Ammar | B60R 1/12 |
| 2007/0053195 | A1* | 3/2007 | Alberti | B60Q 1/2665 |
| | | | | 362/494 |
| 2007/0109807 | A1* | 5/2007 | Lynam | B60K 35/00 |
| | | | | 362/545 |
| 2008/0285293 | A1* | 11/2008 | Sato | B60Q 1/2665 |
| | | | | 362/487 |
| 2009/0161379 | A1* | 6/2009 | Liesener | B60R 1/1207 |
| | | | | 362/494 |
| 2010/0073949 | A1* | 3/2010 | Sato | B60Q 1/007 |
| | | | | 362/494 |
| 2012/0134166 | A1* | 5/2012 | Asai | B60R 1/1207 |
| | | | | 362/514 |
| 2013/0051040 | A1* | 2/2013 | Kracker | B60Q 1/2665 |
| | | | | 362/464 |
| 2014/0191859 | A1* | 7/2014 | Koelsch | H02J 7/0047 |
| | | | | 340/455 |
| 2014/0218212 | A1* | 8/2014 | Nykerk | B60Q 1/0023 |
| | | | | 340/901 |
| 2014/0218521 | A1* | 8/2014 | Tanaka | B60Q 1/24 |
| | | | | 348/148 |
| 2014/0320823 | A1* | 10/2014 | Ammar | B60R 1/12 |
| | | | | 353/13 |
| 2016/0068107 | A1* | 3/2016 | Sawada | F21S 48/30 |
| | | | | 362/540 |
| 2016/0193959 | A1* | 7/2016 | Ammar | B60R 1/12 |
| | | | | 353/13 |
| 2017/0210282 | A1* | 7/2017 | Rodriguez Barros | B60Q 1/323 |

FOREIGN PATENT DOCUMENTS

| | | |
|---|---|---|
| JP | 2008155767 A | 7/2008 |
| JP | 2009208630 A | 9/2009 |
| JP | 2013006439 A | 1/2013 |

OTHER PUBLICATIONS

Office Action issued in a corresponding application JP2015-176925 dated Aug. 9, 2016.

* cited by examiner

VEHICLE VISUAL RECOGNITION DEVICE HAVING PROJECTION UNIT

CROSS-REFERENCE TO RELATED APPLICATION

This application claims priority under 35 USC 119 from Japanese Patent Application, No. 2015-176925 filed Sep. 8, 2015, the disclosure of which is incorporated by reference herein in its entirety.

BACKGROUND

Technical Field

Preferred embodiments relate to a vehicle visual recognition device that projects an image.

Related Art

The specification of Chinese Utility Model Registration No. 202382141 describes a graphic projection lamp in which a film of graphics is provided inside a lamp outer casing, and a diagram on the film is projected outside the lamp outer casing.

SUMMARY

However, graphic projection lamps described in the above related art etc. are sometimes attached to different vehicle types, and so it is preferable to be able to easily obtain an appropriate projection set-up of the graphic, even in cases in which the graphic projection lamp is attached to different vehicle types.

In consideration of the above circumstances, an object of preferred embodiments is to provide a vehicle visual recognition device capable of easily obtaining an appropriate projection set-up of a projection image, even in cases in which an installed vehicle type differs.

A vehicle visual recognition device of a first aspect of the disclosure includes a rotating body that is disposed at a vehicle exterior and that is supported by a vehicle body so as to be rotatable, and that includes a visual recognition unit that assists visual recognition of an occupant of a vehicle, an attachment member that is attached to the rotating body, and a projection unit that includes an optical member housed in a housing body. The housing body is retained by the attachment member, and the projection unit projects an image outside the rotating body through the optical member.

In the vehicle visual recognition device of the first aspect, the attachment member is attached to the rotating body and retains the housing body in which the optical member is housed. The rotating body is supported by the vehicle body so as to be rotatable and is provided with the visual recognition unit that is disposed at the vehicle exterior and assists visual recognition of the occupant of the vehicle. An appropriate attachment state of the housing body to the rotating body is obtained by employing the attachment member such that the projection set-up of an image of the projection unit is appropriate with respect to the vehicle. Moreover, since an appropriate projection set-up of the image can be obtained simply by changing the attachment member depending on vehicle types, the housing body of the projection unit is appropriately attached to different vehicle types.

A vehicle visual recognition device of a second aspect of the disclosure further includes a supporting body that is provided at the rotating body, that supports the visual recognition unit, and to which the attachment member is attached.

In the vehicle visual recognition device of the second aspect, the attachment member is attached to the supporting body that is provided at the rotating body. Thus, the housing body of the projection unit is positioned with high precision with respect to the rotating body and to the vehicle to which the rotating body is attached.

A vehicle visual recognition device of a third aspect of the disclosure includes the first aspect, and the attachment member includes a holder section that retains the housing body, an attachment section attached to the rotating body, and a connecting section that connects the holder section and the attachment section to each other.

In the vehicle visual recognition device of the third aspect, the attachment member is formed by the holder section, the attachment section, and the connecting section that connects the holder section and the attachment section to each other. The connecting section is changed according to the vehicle type to which the rotating body is attached, such that the housing body is attached to the rotating body in an appropriate state, and the projection image is in an appropriate projection set-up. Thus, an appropriate projection set-up of the projection image can be easily obtained simply by changing the connecting section in cases in which the vehicle type to which the rotating body is attached changes.

A vehicle visual recognition device of a fourth aspect of the disclosure includes the third aspect, and the housing body includes a tube section that houses the optical member and that is positioned by the attachment member.

In the vehicle visual recognition device of the fourth aspect, the housing body is positioned by the attachment member using the tube section, thereby positioning the optical member housed in the tube section of the housing body. This enables the optical member to be positioned with high precision with respect to the rotating body and the vehicle. The positioning of the housing body with respect to the attachment member includes positioning about an optical axis of the optical member, thereby making it easier to obtain an even more appropriate projection set-up of the projection image.

A vehicle visual recognition device of a fifth aspect of the disclosure includes the first aspect, and the housing body includes an insertion port through which a connector connected to wiring is inserted, and the attachment member includes a covering portion that covers part of the insertion port.

In the vehicle visual recognition device of the fifth aspect, part of the insertion port for the connector is covered by the covering portion, such that the housing body is not retained by the attachment member if not in a state in which the connector has been securely inserted into the insertion port. Thus, the connector is prevented from being incorrectly inserted and from coming out from the housing body.

A vehicle visual recognition device of a sixth aspect of the disclosure includes the first aspect, and wiring is connected to the housing body, and an extension portion is extended out from the attachment member and is capable of being abutted by the wiring.

In the vehicle visual recognition device of the sixth aspect, the extension portion that is abuttable by the wiring connected to the housing body is formed at the attachment member. Since the housing body is attached to the attachment member, the position of the wiring is restricted by the extension portion.

A vehicle visual recognition device of a seventh aspect of the disclosure includes the first aspect, and the attachment member further includes a positioning portion that positions the attachment member with respect to the rotating body.

In the vehicle visual recognition device of the seventh aspect, the positioning portion is provided at the attachment member, thereby making positioning easier when attaching the attachment member to the rotating body, and enabling the housing body to be positioned with high precision with respect to the rotating body.

A vehicle visual recognition device of an eighth aspect of the disclosure includes the third aspect, and the holder section of the attachment member includes a bottom plate and a side wall, the connecting section of the attachment member is inclined with respect to the side wall at a specific angle θ toward a width direction outer side of the attachment member, and is coupled to an upper end of the side wall, and the attachment section of the attachment member includes two through-holes configuring positioning portions.

In the vehicle visual recognition device of the eighth aspect, the connecting section is inclined and coupled to the side wall of the holder section at the specific angle θ toward the width direction outer side of the attachment member. This also obtains an appropriate attachment state of the attachment member and the housing body to the rotating body, and obtains an appropriate projection set-up of the projection image.

A vehicle visual recognition device of a ninth aspect of the disclosure includes the eighth aspect, and the attachment member is attached to the rotating body through the two through-holes.

In the vehicle visual recognition device of the ninth aspect, the attachment member is attached to the rotating body through the two through-holes, such that positioning when attaching the attachment member to the rotating body is performed with even higher precision, and the housing body is appropriately attached to the rotating body.

A vehicle visual recognition device of a tenth aspect of the disclosure includes the eighth aspect, and the connecting section of the attachment member has a substantially triangular shape, a bottom edge of the connecting section is coupled to the upper end of the side wall, and another edge of the connecting section is coupled to the attachment section.

In the vehicle visual recognition device of the tenth aspect, the connecting section has a substantially triangular shape, the bottom edge of the connecting section is coupled to the upper end of the side wall of the holder section, and another edge of the connecting section is coupled to the attachment section. This also obtains an appropriate state for attachment of the attachment member and the housing body to the rotating body, and obtains an appropriate projection set-up of the projection image.

In each of the above preferred aspects, the housing body of the projection unit is attached to the rotating body using the attachment member, thereby having an advantageous effect of enabling the housing body to be attached to the rotating body so as to obtain an appropriate projection set-up of the projection image with respect to the rotating body and the vehicle.

DETAILED DESCRIPTION

Figure 1:
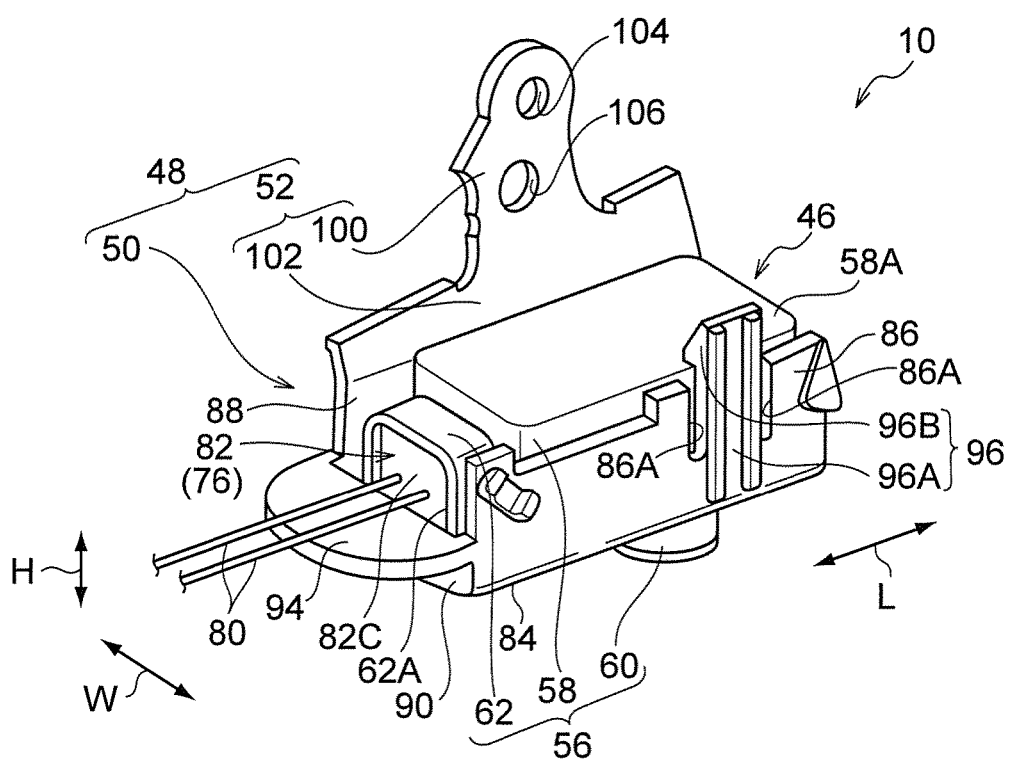
FIG. 1 is a schematic perspective view illustrating a vehicle visual recognition device according to an exemplary embodiment.
Figure 2:
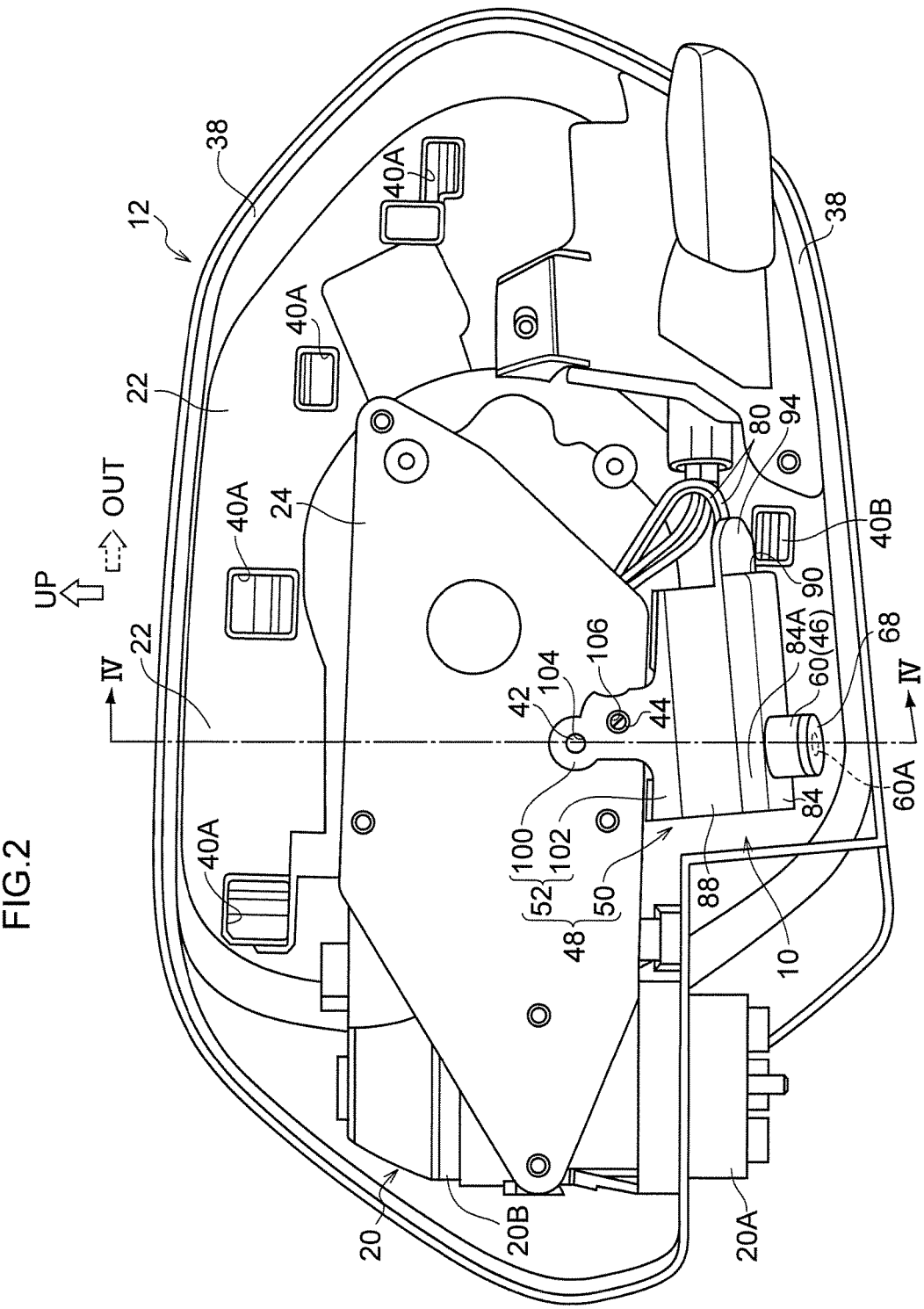
FIG. 2 is a schematic plan view of inside of a door mirror as viewed from a vehicle rear side.
Figure 3:
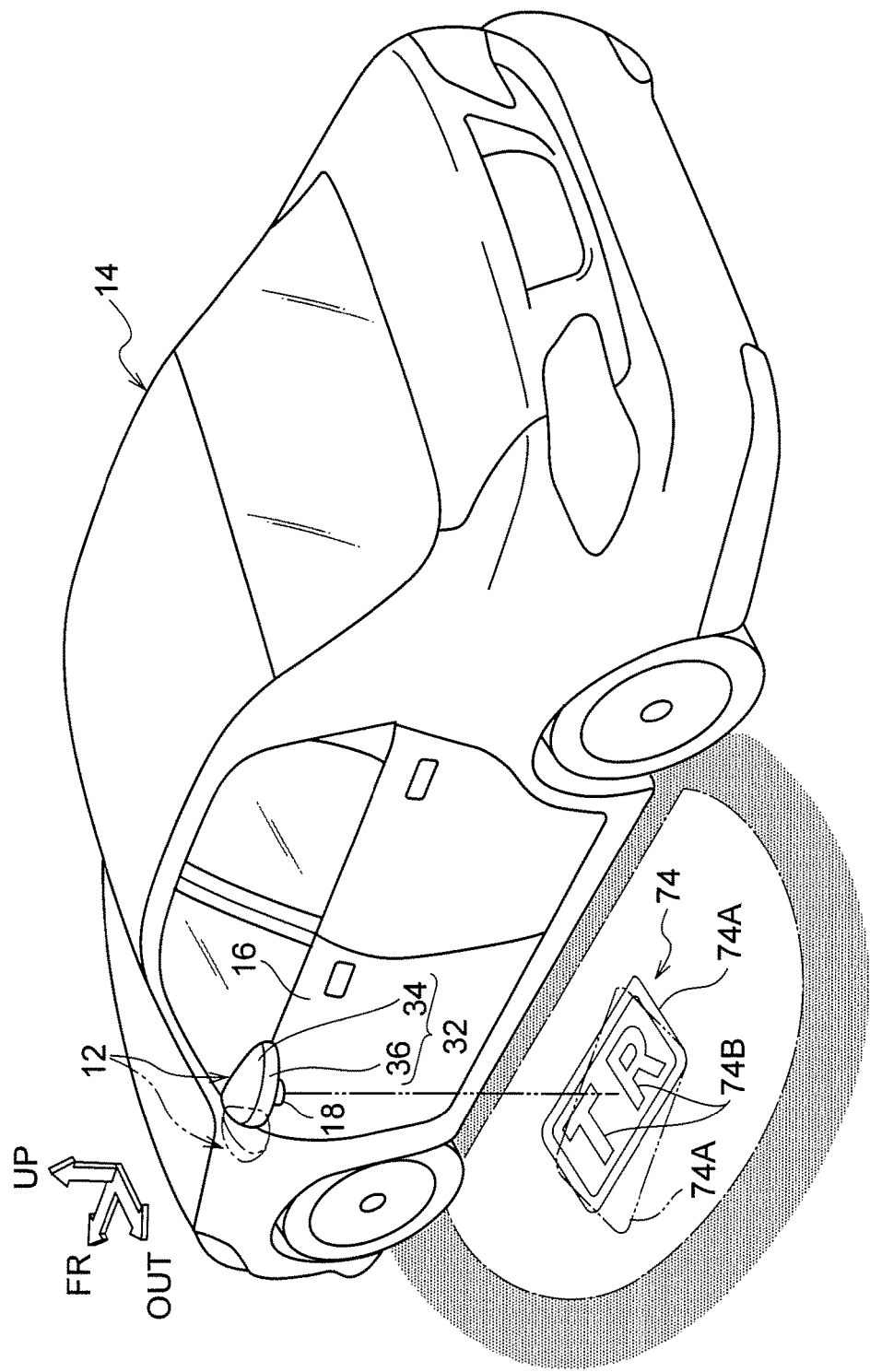
FIG. 3 is a schematic perspective view of relevant portions of a vehicle.

Detailed explanation follows regarding a preferred exemplary embodiment, with reference to the drawings. FIG. 1 illustrates an example of a vehicle illuminating device 10 according to the present exemplary embodiment. FIG. 2 is a schematic plan view illustrating relevant portions of a door mirror 12, serving as a vehicle visual recognition device provided with the vehicle illuminating device 10. FIG. 3 is a schematic perspective view of a vehicle 14 provided with the door mirror 12 as viewed from a rear right side. Note that in the below explanation, the arrow FR indicates forward in a vehicle front-rear direction, the arrow UP indicates upward in a vehicle up-down direction, and the arrow OUT indicates outward in a vehicle width direction.

As illustrated in FIG. 3, the door mirror 12 is provided at a door (front side door) 16 of the vehicle 14 as an example of a vehicle exterior back view mirror (outer mirror). In the present exemplary embodiment, an electrically retractable type of door mirror 12 is employed. The vehicle illuminating device 10 (not illustrated in FIG. 3) is provided at the door mirror 12, and illuminates a specific road surface in the surroundings of the vehicle 14 by a lighting operation, for example. Note that the door mirror 12 provided with the vehicle illuminating device 10 is not limited to being an electrically retractable type, and may be what is referred to as a manually retractable type.

The door mirror 12 is rotatably attached to a stay 18 fixed to the door 16 of the vehicle 14. As illustrated in FIG. 2, a retraction mechanism (retractor) 20 is provided at the door mirror 12. The retraction mechanism 20 includes a stand 20A and a rotating body 20B. The stand 20A is fixed to the stay 18 (see FIG. 3), and the rotating body 20B is supported by the stand 20A.

A visor body 22 is provided at the door mirror 12. The retraction mechanism 20 is attached to the visor body 22. The rotating body 20B of the retraction mechanism 20 is fixed to the visor body 22 at a vehicle width direction inside end portion of the door mirror 12. In the present exemplary embodiment, the rotating body 20B and the door mirror 12B function as examples of a rotating body. The visor body 22 of the present exemplary embodiment functions as an example of a supporting body.

The door mirror 12 is supported by the stay 18 through the retraction mechanism 20, and the retraction mechanism 20 is electrically or manually operated to rotate the door mirror 12 with respect to the stand 20A about an axis running along the up-down direction. The door mirror 12 is rotated from a deployment position (the position illustrated by a double-dotted dashed line in FIG. 3) to a retracted position (the position illustrated by a solid line in FIG. 3) by rotation of the rotating body 20B.

As illustrated in FIG. 2, plate shaped reinforcement 24 made of metal is attached to the door mirror 12. The reinforcement 24 configures the rotating body. The reinforcement 24 is fixed to the visor body 22 by thread such as screws at predetermined positions at a vehicle front side face of the visor body 22. The visor body 22 is reinforced by the reinforcement 24, improving the rigidity of the door mirror 12. The reinforcement 24 is coupled to the rotating body 20B attached to the visor body 22, improving the coupling strength of the rotating body 20B to the visor body 22.

Figure 4:
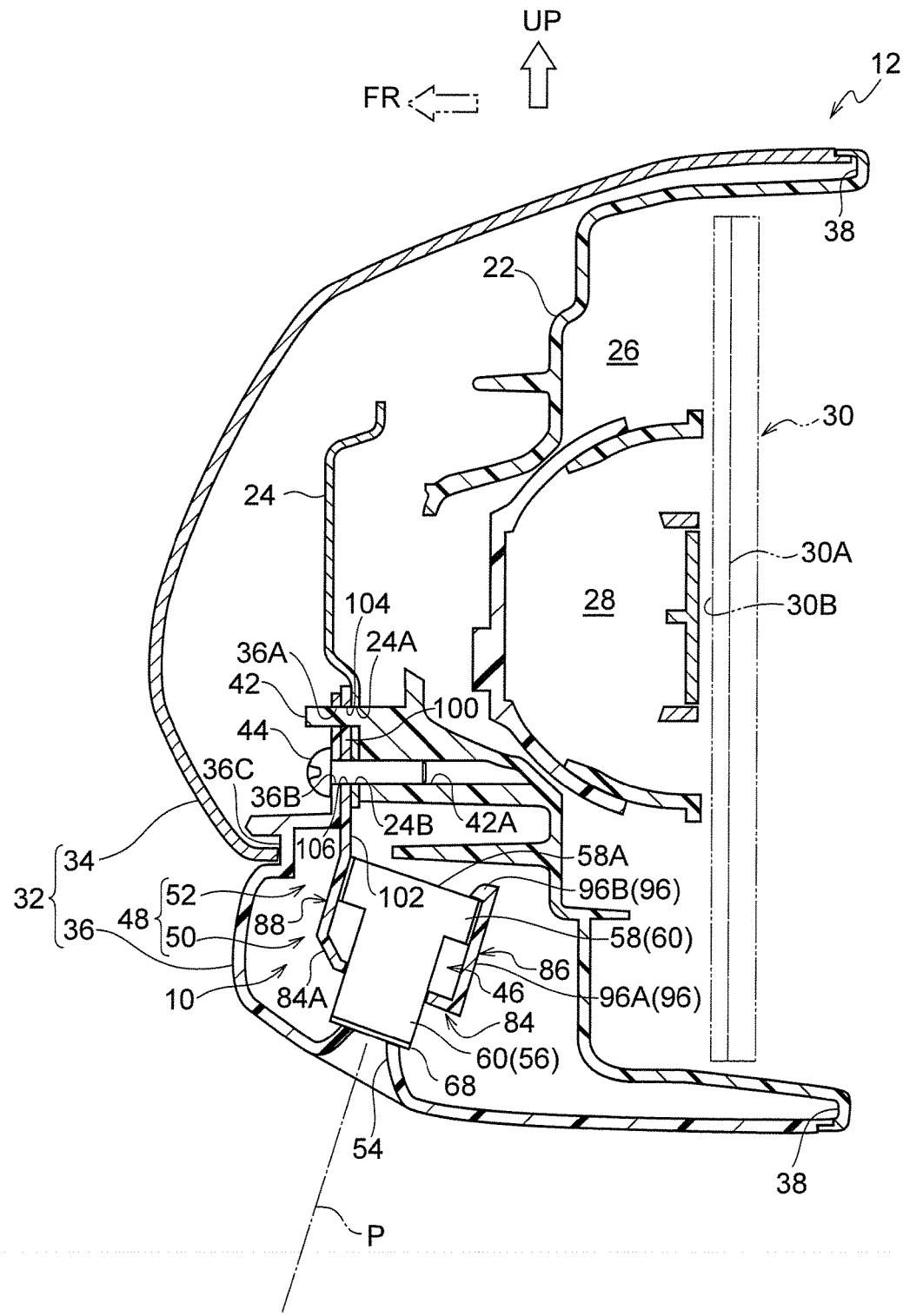
FIG. 4 is a schematic cross-section of relevant portions of a door mirror at a position taken along line IV-IV in FIG. 2.

FIG. 4 is a schematic cross-section illustrating relevant portions of the door mirror 12. A recess shaped housing section 26 with its opening direction facing the vehicle rearward direction (the side in the opposite direction to the arrow FR) is formed in the visor body 22. A mirror surface adjustment mechanism 28 is housed inside the housing section 26. A mirror (mirror body) 30, serving as an example of a visual recognition means, is attached to the mirror surface adjustment mechanism 28. A back face portion 30B of the mirror 30, formed with a reflective surface 30A, is disposed at the opening at the vehicle rear side of the housing section 26 of the visor body 22. The back face portion 30B is attached to the mirror surface adjustment mechanism 28. The reflective surface 30A of the mirror 30 is tilted by operating the mirror surface adjustment mechanism 28. This adjusts an area of the vehicle rearward direction (the region reflected in the mirror 30) of the door mirror 12 that an occupant (driver) inside a vehicle cabin can visually recognize.

As illustrated in FIGS. 3 and 4, the door mirror 12 includes a visor cover 32 configuring a rotating body. In the present exemplary embodiment, the visor cover 32 is formed by an upper visor cover 34 and a lower visor cover 36. As illustrated in FIG. 4, in the door mirror 12, the vehicle front side of the visor body 22 is covered by the visor cover 32.

As illustrated in FIGS. 2 and 4, a groove portion 38 is formed about substantially the entire peripheral edge portion of the visor body 22. As illustrated in FIG. 4, the groove portion 38 is formed by folding back the peripheral edge of the visor body 22 toward the vehicle front side, for example.

As illustrated in FIG. 2, plural attachment holes 40A, and 40B are formed at predetermined positions at the visor body 22. As illustrated in FIGS. 2 and 4, a reference pin 42 is formed projecting out from the visor body 22 at a substantially central portion of the visor body 22 in the vehicle up-down direction and vehicle width direction. As illustrated in FIG. 4, a thread hole 42A is formed at the visor body 22 at a position adjacent to the reference pin 42. A through-hole 24A is formed at the reinforcement 24 at a position corresponding to the reference pin 42, and an insertion hole 24B is formed at the reinforcement 24 at a position corresponding to the thread hole 42A. Thus, the reference pin 42 is fitted into the through-hole 24A, and a screw 44 is inserted through the insertion hole 24B and screwed into the thread hole 42A, thereby positioning and fixing the reinforcement 24 with respect to the visor body 22.

Plural engagement hooks, not illustrated in the drawings, are formed at the upper visor cover 34 at positions corresponding to the attachment holes 40A of the visor body 22, and plural engagement hooks, not illustrated in the drawings, are also formed at the lower visor cover 36 at positions corresponding to the attachment holes 40B of the visor body 22. As illustrated in FIG. 4, the visor cover 32 is formed such that a lower end portion of the upper visor cover 34 and an upper end portion of the lower visor cover 36 overlap each other.

As illustrated in FIG. 4, a through-hole 36A is formed at an upper end portion of the lower visor cover 36 corresponding to the reference pin 42 of the visor body 22, and a through-hole 36B is formed at the lower visor cover 36 at a position corresponding to the thread hole 42A. A groove portion 36C is also formed at the lower visor cover 36 at a position corresponding to a lower end peripheral edge of the upper visor cover 34.

Thus, a leading end at a lower end peripheral edge of the lower visor cover 36 is fitted into the groove portion 38 of the visor body 22, the engagement hooks are inserted into and engaged with the attachment holes 40B (see FIG. 2) as described above, and the reference pin 42 is fitted into the through-hole 36A. Moreover, the screw 44 is inserted into the through-hole 36B of the lower visor cover 36 and screwed into the thread hole 42A of the visor body 22, thereby assembling and fixing the lower visor cover 36 to the visor body 22. Moreover, a leading end of a peripheral edge of the upper visor cover 34 is fitted into the groove portion 38 of the visor body 22 and into the groove portion 36C of the lower visor cover 36, and the engagement hooks are inserted into and engaged with the attachment holes 40A (see FIG. 2) as described above, thereby assembling the upper visor cover 34 to the visor body 22. Thus, in the door mirror 12, the vehicle front side of the visor body 22 is covered by the visor cover 32.

As illustrated in FIGS. 2 and 4, the vehicle illuminating device 10 is attached to the visor body 22, and covered by the visor cover 32. As illustrated in FIG. 1, the vehicle illuminating device 10 includes a lamp unit 46 and a holder bracket 48. The holder bracket 48A is formed by a holder section 50 and a bracket section 52 that are integral to each other. The holder section 50 houses the lamp unit 46 and the bracket section 52 extends out from the holder section 50. In the present exemplary embodiment, the lamp unit 46 functions as an example of a projection unit, the holder bracket 48 functions as an example of an attachment member, and the holder section 50 functions as an example of a holder section.

As illustrated in FIG. 4, an illumination hole 54 that is open toward the vehicle lower side is formed at a specific position at the lower visor cover 36. By fixing the bracket section 52 to a specific position of the visor body 22 in the vehicle illuminating device 10, the lamp unit 46 housed in the holder section 50 is disposed in a preset position and orientation, and faces the illumination hole 54 of the lower visor cover 36.

As illustrated in FIG. 3, in the door mirror 12, light emitted from the lamp unit 46 is radiated through the illumination hole 54 toward the vehicle lower side. Thus, the ground surface surrounding the door 16 of the vehicle 14 is illuminated by light radiated from the door mirror 12.

Figure 5A:
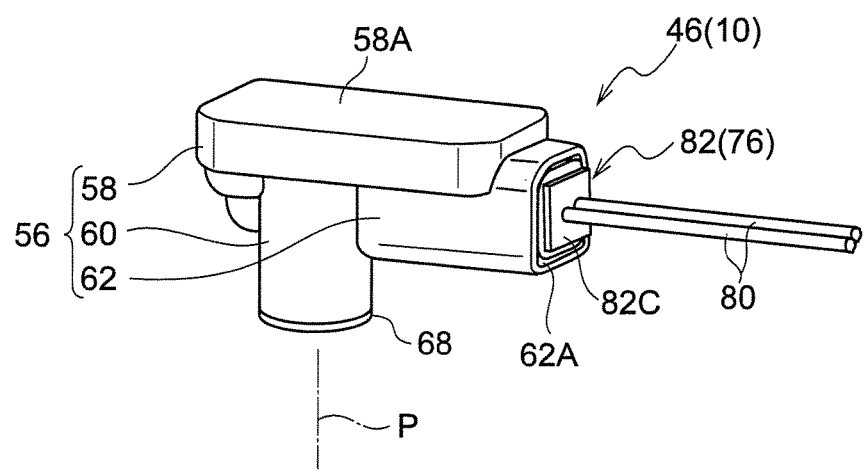
FIG. 5A is a schematic perspective view of a lamp unit according to the exemplary embodiment.
Figure 5B:
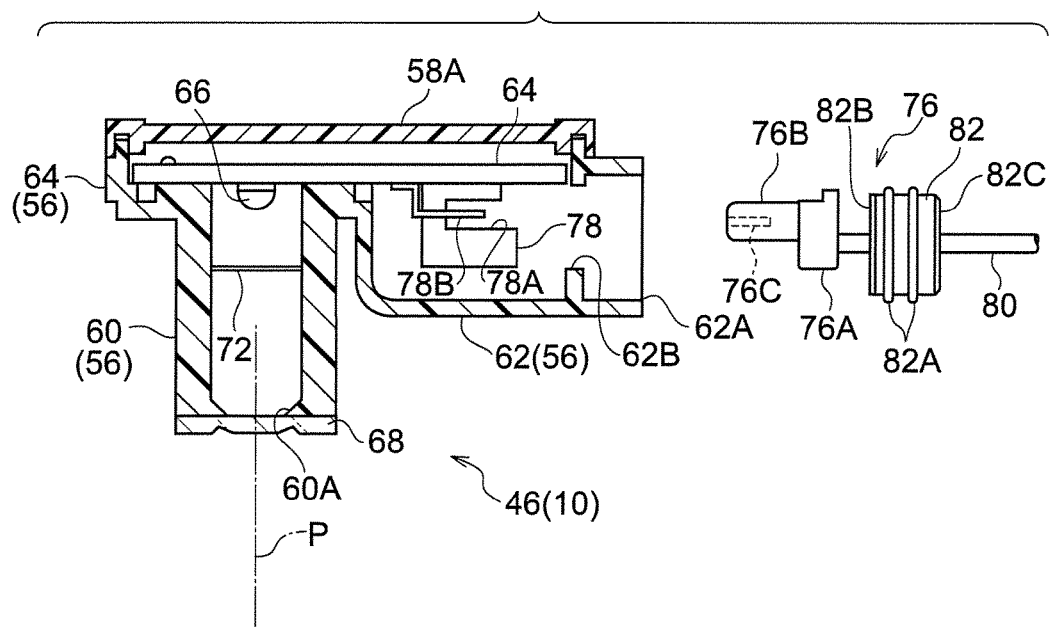
FIG. 5B is a cross-section of relevant portions of a lamp unit according to the exemplary embodiment.

FIGS. 5A and 5B illustrate an example of the lamp unit 46 according to the present exemplary embodiment. The lamp unit 46 includes housing 56. The housing 56 includes a rectangular, thin box shaped substrate section 58, a tube section 60 disposed at one face of the substrate section 58 at one length direction end side of the substrate section 58, and a substantially rectangular body shaped socket section 62 disposed at another length direction end side of the one face of the substrate section 58. In the present exemplary embodiment, the housing 56 (the substrate section 58, tube section 60, and socket section 62) functions as an example of a housing body, and the tube section 60 functions as an example of a tube section.

As illustrated in FIG. 5B, the tube section 60 is coupled to the substrate section 58 such that its axial line direction intersects the length direction of the substrate section 58. The tube section 060 is, together with the socket section 62, in communication with the inside of the substrate section 58. The lamp unit 46 includes a circuit board 64, and the circuit board 64 is attached inside the substrate section 58 so as to span between the tube section 60 and the socket section 62. A face of the substrate section 58 at the opposite side to the face where the tube section 60 and the socket section 62 are formed is tightly sealed by a lid member 58A.

A light-emitting diode (LED) 66, serving as an example of a light source, is provided at the circuit board 64. An optical axis (light emitting center) of the LED 66 is disposed coaxially to the axial line of the tube section 60, and an optical system, forming a light path of light emitted from the LED 66, is formed in the tube section 60 by using an optical member including a lens 68 disposed in a light-radiating port 60A of the tube section 60. Thus, light emitted from the LED 66 passes through inside the tube section 60 and is emitted through the lens 68 provided at the light-radiating port 60A. Note that in the following explanation, the optical axis of light emitted from the lamp unit 46 is indicated by the reference sign P.

As illustrated in FIG. 4, in the lamp unit 46, the light-radiating port 60A at an open end of the tube section 60 faces the illumination hole 54 of the lower visor cover 36, such that light emitted from the LED 66 is radiated through the illumination hole 54.

As illustrated in FIG. 5B, a film 72, serving as an optical member and formed with a pattern of a projection image, is disposed in the tube section 60 of the lamp unit 46. The film 72 is disposed on the light path inside the tube section 60, and light emitted from the LED 66 to be radiated onto the ground surface passes through the film 72. The film 72 is attached inside the tube section 60 such that the pattern is arranged toward a predetermined orientation within a rotation range of the pattern about the optical axis P. Various letters, graphics, shapes, symbols, and so on that enable the manufacturer, vehicle type, grade, and so on of the vehicle 14 to be identified may be employed as patterns formed on the film 72.

Thus, as illustrated in FIG. 3, a projection image 74 corresponding to the pattern formed on the film 72 is projected onto the ground surface surrounding the vehicle 14 by the vehicle illuminating device 10. Note that in the present exemplary embodiment, letters 74B are disposed inside a rectangular shaped frame 74A as an example of the projection image 74.

As illustrated in FIGS. 5A and 5B, an end portion of the socket section 62 at the opposite side to the tube section 60 is open, and a substantially rectangular shaped insertion port 62A is formed at the socket section 62 of the lamp unit 46. A connector 76 is inserted into the socket section 62 through the insertion port 62A.

As illustrated in FIG. 5B, a pin holder 78 with a substantially rectangular shaped outer profile, for example, is attached to the circuit board 64 and disposed inside the socket section 62. A recessed portion 78A with a rectangular shaped opening is formed at one face of the pin holder 78, and the opening of the recessed portion 78A faces toward the insertion port 62A. A protrusion shaped portion 62B is formed between the insertion port 62A and the pin holder 78 such that the opening cross-section of the socket section 62 becomes narrower at the protrusion shaped portion 62B.

A pair of pin electrodes 78B are provided at the pin holder 78 so as to project out inside the recessed portion 78A toward the insertion port 62A side. The pin electrodes 78B are connected to the LED 66 at the circuit board 64, and the LED 66 is lit (emits light) by applying lighting voltage to the pair of pin electrodes 78B in the lamp unit 46.

The connector 76 inserted into the socket section 62 is provided with a base portion 76A and an insertion portion 76B that projects out from the base portion 76A. An outer profile of the base portion 76A is matched to the cross-section profile inside the socket section 62 made narrower by the protrusion shaped portion 62B, and the insertion portion 76B is matched to an inner face profile of the recessed portion 78A formed in the pin holder 78. Electrodes 76C corresponding to the pin electrodes 78B are disposed inside the insertion portion 76B of the connector 76. Lamp wiring 80, which is connected to a non-illustrated lighting circuit and supplies lighting voltage to the LED 66, is connected to the electrodes 76C of the connector 76. The lamp wiring 80 connected to the electrodes 76C is routed from the base portion 76A at the opposite side to the insertion portion 76B.

A grommet 82 is provided at the connector 76, and the lamp wiring 80 is inserted through the grommet 82. As illustrated in FIGS. 5A and 5B, an outer profile of the grommet 82 is formed in a substantially rectangular shape matched to the opening cross-section of the insertion port 62A of the socket section 62, and as an example, two ridge portions 82A are formed at an outer peripheral face of the grommet 82.

The grommet 82 is formed such that an end face 82C at the opposite side to the base portion 76A is aligned with an open end of the insertion port 62A in a state in which an end face 82B at the base portion 76A side of the connector 76 has abutted the protrusion shaped portion 62B of the socket section 62. Leading ends of the ridge portions 82A abut and are resiliently compressed by an inner peripheral face of the socket section 62 in a state in which the grommet 82 has been inserted into the socket section 62 through the insertion port 62A. Thus, in the lamp unit 46, the insertion port 62A of the socket section 62 is sealed by the grommet 82 provided at the connector 76, preventing ingress of rainwater droplets or the like through the insertion port 62A.

Figure 6A:
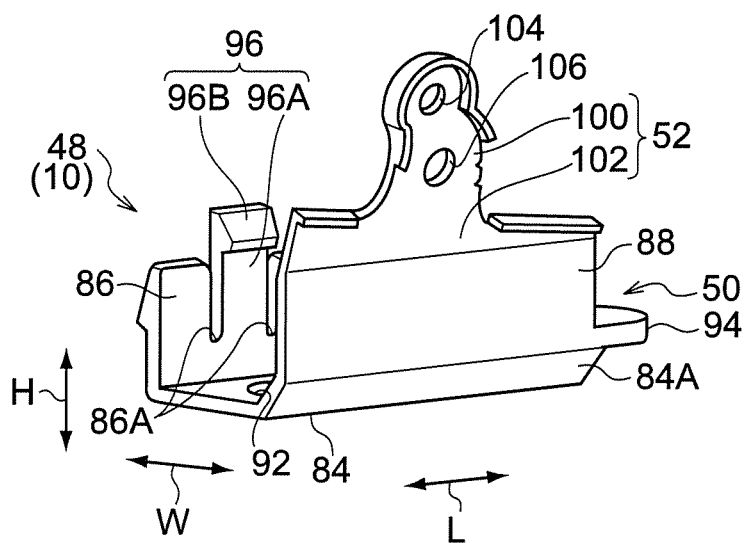
FIG. 6A is a schematic perspective view of a holder bracket according to the exemplary embodiment.
Figure 6B:
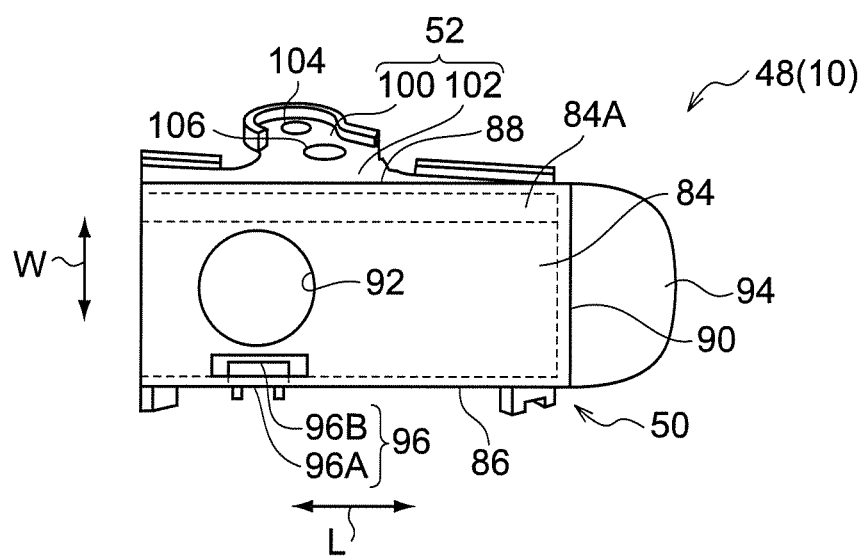
FIG. 6B is a schematic plan view of a holder bracket according to the exemplary embodiment as viewed from below.
Figure 6C:
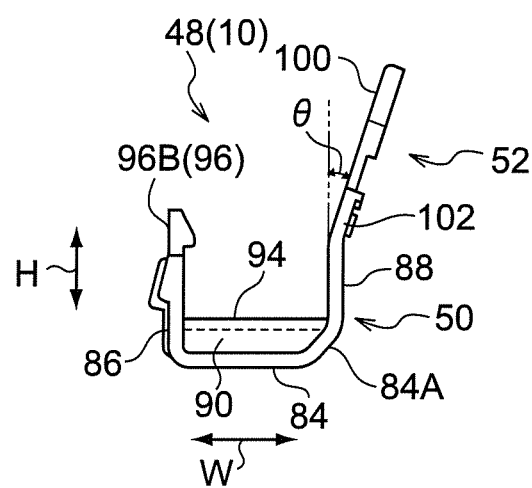
FIG. 6C is a schematic elevation view of a holder bracket according to the exemplary embodiment as viewed from one length direction end side.

FIGS. 6A to 6C illustrate an example of the holder bracket 48 according to the present exemplary embodiment. The holder section 50 of the holder bracket 48 includes a bottom plate 84 formed in a substantially rectangular flat plate shape, and the lamp unit 46 is disposed on the bottom plate 84 (see FIG. 1). Note that in the explanation of the holder bracket 48, the bottom plate 84 of the holder section 50 is taken as a reference, such that a length direction and a width direction of the bottom plate 84 correspond to a length direction (the arrow L direction) and a width direction (the arrow W direction) of the holder bracket 48, and a direction running from the bottom plate 84 toward the bracket section 52 configures a height direction (the arrow H direction) of the holder bracket 48.

As illustrated in FIGS. 6A to 6C, in the holder section 50, a side wall 86 projects upward at one width direction end of the bottom plate 84, and a side wall 88 projects upward at another width direction end of the bottom plate 84. The bracket section 52 is formed at the holder bracket 48 so as to be continuous to the side wall 88 of the holder section 50.

As illustrated in FIGS. 1 and 6B, in the holder section 50, a short wall 90, functioning as an example of a covering portion, projects upward at one length direction end of the bottom plate 84, and a through-hole 92 is formed at another length direction end of the bottom plate 84. The short wall 90 is formed so as to couple the side wall 86, the side wall 88, and an end portion of the bottom plate 84 together. An extension portion 94, serving as an extension portion, is formed at an upper end of the short wall 90. The extension portion 94 extends in the opposite direction to the bottom plate 84 from the upper end of the short wall 90, and is formed in a flat plate shape with a semicircular shaped leading end portion. The short wall 90 faces the insertion port 62A of the socket section 62 of the lamp unit 46 that is mounted onto the bottom plate 84, and is formed having a height that covers part of the insertion port 62A.

The side walls 86, 88 of the holder section 50 are formed with a spacing therebetween corresponding to a width direction outer profile dimension of the substrate section 58 of the lamp unit 46. The through-hole 92 of the holder section 50 is formed with an inner diameter corresponding to an outer diameter of the tube section 60 of the lamp unit 46. The lamp unit 46 is inserted from the tube section 60 side between the side walls 86, 88, the tube section 60 is fitted into the through-hole 92, and the lamp unit 46 is mounted on the bottom plate 84 in a state wedged between the side walls 86, 88. Thus, the optical axis P and the orientation of the lamp unit 46 with respect to the optical axis P are positioned with respect to the holder section 50, and the lamp unit 46 is installed at the holder section 50.

As illustrated in FIG. 1, in the lamp unit 46 that has been positioned at the holder section 50 with the tube section 60 fitted into the through-hole 92, the short wall 90 contacts an end face at the insertion port 62A side of the socket section 62, and part of the insertion port 62A is covered by the short wall 90. If, for example, the lamp unit 46 is in a state in which the grommet 82 of the connector 76 has popped out of the insertion port 62A without the connector 76 being securely inserted into the socket section 62, the upper end of the short wall 90 abuts the grommet 82, the socket section 62 is lifted up from the bottom plate 84 without being fitted to the holder section 50, and the lamp unit 46 is not positioned by the holder section 50 when installing the lamp unit 46 in the holder section 50. The holder section 50 thereby acts so as to clarify whether or not the connector 76 is securely installed in the socket section 62 of the lamp unit 46. The upper end of the short wall 90 is lower than the lamp wiring 80 routed through the grommet 82. Thus, the position of the lamp unit 46 is regulated such that, for example, the lamp wiring 80 abuts the extension portion 94 in a state in which the lamp unit 46 has been installed in the holder section 50.

As illustrated in FIGS. 1 and 6A, a retaining claw 96 is formed at the side wall 86 of the holder section 50. A pair of grooves 86A is formed running along the up-down direction at the side wall 86. A supporting portion 96A of the retaining claw 96 is formed between the pair of grooves 86A so as to swing with respect to the side wall 88, and a claw portion 96B of the retaining claw 96 is formed at a leading end of the supporting portion 96A. A lower end of the claw portion 96B faces an upper face of the substrate section 58 (an upper face of the lid member 58A) of the lamp unit 46 disposed on the bottom plate 84. Thus, the lamp unit 46 is wedged between the bottom plate 84 and the claw portion 96B in the height direction, and is retained at the holder section 50.

As illustrated in FIGS. 6A to 6C, an inclined portion 84A is formed at a side wall 88 side of the bottom plate 84 of the holder section 50. The side wall 88 projects upward from a leading end of the inclined portion 84A, and the bracket section 52 projects upward from an upper end of the side wall 88. As illustrated in FIG. 1 and FIGS. 6A to 6C, a fixing portion 100 and a connecting section 102 are formed so as to be flush to each other at the bracket section 52. In the present exemplary embodiment, the fixing portion 100 functions as an example of an attachment section, and the connecting section 102 functions as an example of a connecting section. The fixing portion 100 is formed by overlapping circular plates with different axial centers, is formed with a through-hole 104 at an axial center portion of one circular plate, and is further formed with an insertion hole 106 at another axial center portion of the other circular plate. Both the through-hole 104 and the insertion hole 106 are used as positioning portions.

As illustrated in FIG. 4, the through-hole 104 of the holder bracket 48 corresponds to the reference pin 42 of the visor body 22, and the insertion hole 106 corresponds to the thread hole 42A. The screw 44 inserted into the insertion hole 106 is screwed into the thread hole 42A of the visor body 22 in a state in which the reference pin 42 has been fitted into the through-hole 104 of the bracket section 52 to position the holder bracket 48. Thus, the holder bracket 48 is positioned in the vehicle up-down direction and the vehicle width direction with respect to the visor body 22 and the holder bracket 48 is also positioned in a rotation direction about an axis of the reference pin 42. The holder bracket 48 is fixed to the visor body 22 together with the reinforcement 24.

As illustrated in FIGS. 1, 2, and FIGS. 6A and 6B, the connecting section 102 of the holder bracket 48 is formed in a predetermined shape. In the present exemplary embodiment as an example, the connecting section 102 is formed in a substantially triangular shape and is coupled to an upper end of the side wall 88. The connecting section 102 is inclined at a specific angle θ toward the width direction W outer side of the holder bracket 48 with respect to the side wall 88. Namely, the fixing portion 100 of the bracket section 52 is formed at the holder bracket 48 such that the lamp unit 46 installed in the holder section 50 is retained in a predetermined position with respect to the visor body 22 of the door mirror 12. Note that the connecting section 102 may not only be inclined with respect to the side wall 88 of the holder section 50 but also be angled (twisted) in the rotation direction about the axis of the reference pin 42.

In the holder bracket 48, the tube section 60 of the lamp unit 46 installed in the holder section 50 is made to face the illumination hole 54 of the lower visor cover 36, and the connecting section 102 is formed such that the optical axis P is at a predetermined angle and such that the rotation position (orientation) of the lamp unit 46 about the optical axis P is at a predetermined orientation. Thus, the connecting section 102 is formed at the holder bracket 48 such that light radiated from the door mirror 12 illuminates a specific region in the vehicle width direction of the vehicle 14, and the lamp unit 46 is retained such that the projection image 74 on the illuminated ground surface is at an orientation that is not angled with respect to the vehicle 14.

Note that in the present exemplary embodiment, as illustrated in FIG. 3, for example, the angle of the optical axis P of the lamp unit 46 is set such that the ground surface at vehicle width direction outer side of the door 16 is illuminated over a specific range in the retracted state of the door mirror 12. The orientation of the lamp unit 46 in the rotation direction about the optical axis P is set such that the frame 74A of the projection image 74 projected onto the ground surface is parallel to the vehicle 14. The angle of the optical axis P is angled such that the projection image 74 is projected at a predetermined distance from the vehicle 14.

The lamp unit 46 is installed at the holder section 50 of the holder bracket 48 prior to attaching the vehicle illuminating device 10 configured in this manner to the door mirror 12. In a state in which the tube section 60 faces the bottom plate 84 side, the lamp unit 46 is inserted between the side walls 86, 88 while the supporting portion 96A of the retaining claw 96 is tipped over toward the opposite side to the side wall 88, and the tube section 60 is fitted into the through-hole 92 at the holder section 50 to mount the lamp unit 46 on the bottom plate 84. The lamp unit 46 is wedged between the side walls 86, 88, and also wedged between the bottom plate 84 and the claw portion 96B, the tube section 60 is fitted into the through-hole 92, and the open end of the socket section 62 is abutted by the short wall 90. Thus, the lamp unit 46 is positioned on the bottom plate 84 of the holder section 50 and retained by the holder section 50. When this is performed in the lamp unit 46, the short wall 90 formed to the holder section 50 abuts the open end of the insertion port 62A of the socket section 62 and covers part of the insertion port 62A. Thus, the lamp unit 46 is reliably prevented from being installed in the holder section 50 in a state in which the connector 76 has been incorrectly inserted, and the connector 76 is prevented from coming out of the insertion port 62A after installation.

The holder bracket 48 with the lamp unit 46 installed in the holder section 50 is, for example, disposed such that a side at the side wall 86 of the holder section 50 is at the visor body 22 side of the door mirror 12, and the reference pin 42 of the visor body 22 is fitted into the through-hole 104 of the bracket section 52. In a state in which the reference pin 42 has been fitted into the through-hole 104, the screw 44, to which the lower visor cover 36 is assembled, is inserted into the insertion hole 106 of the bracket section 52 and is screwed into the thread hole 42A, such that the holder bracket 48 is positioned and fixed together with the lower visor cover 36 with respect to the visor body 22, whereby the holder bracket 48 is assembled to the door mirror 12. The upper visor cover 34 is then assembled to the door mirror 12, such that both the lamp unit 46 and the visor body 22 are covered by the visor cover 32.

Note that when the holder bracket 48 is being assembled to the visor body 22, the position of the lamp wiring 80 that is routed from the lamp unit 46 is regulated by abutting the extension portion 94 formed at the holder section 50, and the lamp wiring 80 is prevented from hanging down toward a lower visor cover 36 side. This prevents the lamp wiring 80 from becoming caught on the non-illustrated engagement claws that are engaged by the attachment holes 40B, for example, when the lower visor cover 36 is being assembled.

In the holder bracket 48 employed in the vehicle illuminating device 10, the holder section 50 is formed so as to follow a shape of the lamp unit 46, and the fixing portion 100 of the bracket section 52 is formed so as to suit the visor body 22 of the door mirror 12. Thus, the lamp unit 46 of the vehicle illuminating device 10 is accurately and easily assembled to the visor body 22 of the door mirror 12.

In the holder bracket 48, the connecting section 102 that couples the holder section 50 and the fixing portion 100 together is formed such that the optical axis P of the lamp unit 46, and the orientation of the lamp unit 46 about the optical axis P, are set with respect to the door mirror 12 and to the vehicle 14 to which the door mirror 12 is attached. Namely, the size, shape, and angle θ with respect to the side wall 88 of the connecting section 102 are set to suit the door mirror 12 and the vehicle 14 to which the door mirror 12 is attached.

Thus, the lamp unit 46 of the vehicle illuminating device 10 is positioned not only with respect to the door mirror 12, but also with respect to the vehicle 14 to which the door mirror 12 is attached. This enables the vehicle illuminating device 10 to radiate light in a predetermined region with respect to the vehicle 14. This also enables the vehicle illuminating device 10 to project the projection image 74 at an appropriate orientation with respect to the vehicle 14.

In door mirrors 12 in general, flexing of the visor cover 32 is liable to occur. Additionally, an outer profile of the visor cover 32 changes according to styling of a vehicle. An attachment height of the door mirror 12 to the vehicle 14, and inclination of the rotation axis of the rotating body 20B of the retraction mechanism 20, also sometimes differ according to vehicle type. Thus, in the vehicle illuminating device 10 attached to the door mirror 12, the angle of the optical axis P and the position about the optical axis P change, and a projection set-up of the projection image changes, according to the type of door mirror 12 and the type of vehicle 14.

When the angle and so on of the optical axis P change, the region illuminated by the lamp unit 46 may become too close to, or too far from, the vehicle 14. When the orientation of the lamp unit 46 within the rotation region of the lamp unit 46 about the optical axis P changes, the frame 74A of the projection image 74 projected onto the ground surface is rotated about the optical axis P (illustrated by a double-dotted dashed line in FIG. 3). The appearance (styling) of the projection image 74 projected on the ground surface is sometimes negatively affected as a result.

Note that, the vehicle illuminating device 10 can employ the holder bracket 48 which is formed with a bracket section adjusted to suit the type of door mirror 12 and the type of vehicle 14. This enables the vehicle illuminating device 10 to be attached to the door mirror 12 such that the projection image 74 has an appropriate projection set-up, regardless of the type of door mirror 12 and the type of vehicle 14. The vehicle illuminating device 10 can be set such that the projection image 74 has an appropriate projection set-up by a simple assembly operation in which the holder bracket 48 is fixed to the visor body 22 of the door mirror 12. Thus, the vehicle illuminating device 10 can obtain a projection set-up such that the projection image 74 is at an appropriate orientation and the optical axis P of the lamp unit 46 is at an appropriate angle, even in cases in which the type of door mirror 12, or the type of vehicle 14 to which the door mirror 12 is attached, has changed.

The vehicle illuminating device 10 is not attached to the visor cover 32 but is attached to the visor body 22 that has a higher rigidity than the visor cover 32. This enables the vehicle illuminating device 10 to be attached with high precision with respect to the door mirror 12 and to the vehicle 14 to which the door mirror 12 is attached. Moreover, the vehicle illuminating device 10 maintains a high positioning precision after being assembled to the door mirror 12.

Note that in the present exemplary embodiment explained above, the lamp unit 46 and the holder bracket 48 have been explained as examples; however, the lamp unit 46 and the holder bracket 48 do not limit the configuration of the present invention. The present invention is not limited to the lamp unit 46, and a desired configuration of a projection unit that projects projection images may be applied. The present invention is also not limited to the holder bracket 48, and an attachment member may be applied with a configuration capable of setting an appropriate set-up for a projection image of a projection unit.

In the present exemplary embodiment explained above, the vehicle illuminating device 10 provided at the door mirror 12 is given as an example; however, the vehicle visual recognition device provided with the vehicle illuminating device is not limited to the door mirror 12, and may be a fender mirror. Moreover, the vehicle visual recognition device provided with the vehicle illuminating device may be provided at a rotating body provided with a camera serving as a visual recognition means that images vehicle rear area.

In the present exemplary embodiment, projection of the pattern formed by the film 72 has been given as an example; however, the projection image may be formed by a display medium such as a liquid crystal display (LCD) that is able to transmit light and is capable of changing the display image. Thus, the vehicle illuminating device provided at the vehicle visual recognition device enables desired images or moving images to be displayed in the surroundings of the vehicle.

What is claimed is:

1. A vehicle visual recognition device comprising:
    a rotating body disposed at a vehicle exterior and supported by a vehicle body so as to be rotatable, and including a visual recognition unit that assists visual recognition of an occupant of a vehicle, a supporting body, a visor cover, and a reinforcement member;
    an attachment member attached to the supporting body of the rotating body;
    a projection unit including an optical member housed in a housing body, the housing body being retained by the attachment member, and the projection unit projecting an image outside the rotating body through the optical member,
    wherein the supporting body attached to the rotating body and supporting the visual recognition unit, the supporting body, visual recognition unit, and projection unit all rotate with the rotating body, and
    wherein the attachment member is directly fixed to the visor cover and the reinforcement member such that the attachment member is fixed to the supporting body via the reinforcement member,
    wherein the attachment member includes:
        a holder section that retains the housing body,
        an attachment section attached to the rotating body, and
        a connecting section that connects the holder section and the attachment section to each other,
    wherein a first through-hole is formed at the attachment section, a connecting member that is formed at the supporting body is inserted into the first through-hole such that the attachment section is connected to the supporting body with the attachment member being hanged down substantially in a vehicle up and down direction, and
    wherein the holder section of the attachment member includes a bottom plate and a side wall, the connecting section of the attachment member is inclined with respect to the side wall at a specific angle θ toward a width direction outer side of the attachment member and is coupled to an upper end of the side wall, and the attachment section of the attachment member includes a second through hole configuring a positioning portion.

2. The vehicle visual recognition device of claim 1, wherein the housing body includes a tube section that houses the optical member and that is positioned by the attachment member.

3. The vehicle visual recognition device of claim 1, wherein:
    the housing body includes an insertion port through which a connector connected to wiring is inserted; and
    the attachment member includes a covering portion that covers part of the insertion port.

4. The vehicle visual recognition device of claim 1, wherein:
    wiring is connected to the housing body; and
    an extension portion is extended out from the attachment member and is capable of being abutted by the wiring.

5. The vehicle visual recognition device of claim 1, wherein
    the attachment member further includes a positioning portion that positions the attachment member with respect to the rotating body.

6. The vehicle visual recognition device of claim 1, wherein the attachment member is fixed to the rotating body and the supporting body through the first and second through-holes.

7. The vehicle visual recognition device of claim 1, wherein: the connecting section of the attachment member has a substantially triangular shape; a bottom edge of the connecting section is coupled to the upper end of the side wall; and another edge of the connecting section is coupled to the attachment section.

8. The vehicle visual recognition device of claim 1, wherein the attachment member hangs down from the reinforcement member in substantially a vehicle up-down direction.

9. The vehicle visual recognition device of claim 1, further comprising a covering body substantially enclosing the rotating body, the attachment member, and the supporting body.

10. The vehicle visual recognition device of claim 1, wherein the attachment section of the attachment member directly contacts the visor cover and the reinforcement member, respectively.

11. A vehicle visual recognition device comprising:
    a rotating body disposed at a vehicle exterior and supported by a vehicle body so as to be rotatable, and including a visual recognition unit that assists visual recognition of an occupant of a vehicle, a supporting body, a visor cover, and a reinforcement member;
    an attachment member attached to the supporting body of the rotating body;
    a projection unit including an optical member housed in a housing body, the housing body being retained by the attachment member, and the projection unit projecting an image outside the rotating body through the optical member,
    wherein the supporting body attached to the rotating body and supporting the visual recognition unit, the supporting body, visual recognition unit, and projection unit all rotate with the rotating body, and
    wherein the attachment member is directly fixed to the visor cover and the reinforcement member such that the attachment member is fixed to the supporting body via the reinforcement member, and
    wherein the supporting body is a visor body, and the attachment member is a holder bracket that holds the projection unit and which is attached to the visor body.

12. The vehicle visual recognition device of claim 11, wherein the holder bracket includes a positioning portion connected to the visor body via the reinforcement member, the positioning portion being adjustable to align an optical axis P of the projection unit along a selected angle such that a projection image is projected from the projection unit at a desired location with respect to the vehicle.

13. The vehicle visual recognition device of claim 12, wherein the positioning portion of the holder bracket is a bendable flange that attaches the holder bracket to the visor body.

* * * * *